United States Patent [19]

O'Toole et al.

[11] 4,014,438
[45] Mar. 29, 1977

[54] SPRING FASTENER

[75] Inventors: Jerome M. O'Toole, Shrewsbury; Martin L. Haskins, Whitinsville, both of Mass.

[73] Assignee: Wright Line Inc., Worcester, Mass.

[22] Filed: Sept. 17, 1975

[21] Appl. No.: 614,000

[52] U.S. Cl. .............................. 211/13; 16/DIG. 13; 211/40; 248/300; 312/10

[51] Int. Cl.² .......................................... A47F 7/00

[58] Field of Search ............ 211/40, 49 D, 51, 183, 211/13; 16/150, 180, 184, DIG. 13; 248/204, 300, 316 D; 24/73 PF, 73 P; 312/10, 15

[56] References Cited

UNITED STATES PATENTS

| 990,856 | 5/1911 | Freiberg | 248/300 X |
|---|---|---|---|
| 2,507,965 | 5/1950 | Eichner | 211/183 UX |
| 2,555,204 | 5/1951 | Sorrell | 16/150 |
| 2,689,027 | 9/1954 | Flora | 248/316 D |
| 2,892,220 | 6/1959 | Gillespie | 16/150 |
| 3,310,178 | 3/1967 | Wright | 211/40 |
| 3,516,115 | 6/1970 | Koleske | 16/150 |
| 3,618,161 | 11/1971 | Nozawa | 16/150 |
| 3,638,800 | 2/1972 | Frederick et al. | 211/40 |
| 3,696,935 | 10/1972 | Dean | 211/13 |

*Primary Examiner*—James T. McCall
*Assistant Examiner*—Robert W. Gibson, Jr.
*Attorney, Agent, or Firm*—Milton E. Gilbert

[57] ABSTRACT

A one-piece spring fastener for connecting two members is disclosed which is useful as a replacement for a spring-biased hinge. The fastener has a body section with spring clips and a tab for locking the body section to one member and a leaf spring section that projects from one side of the body section and has means for attaching it to a second member.

6 Claims, 8 Drawing Figures

U.S. Patent  Mar. 29, 1977  Sheet 1 of 2  4,014,438
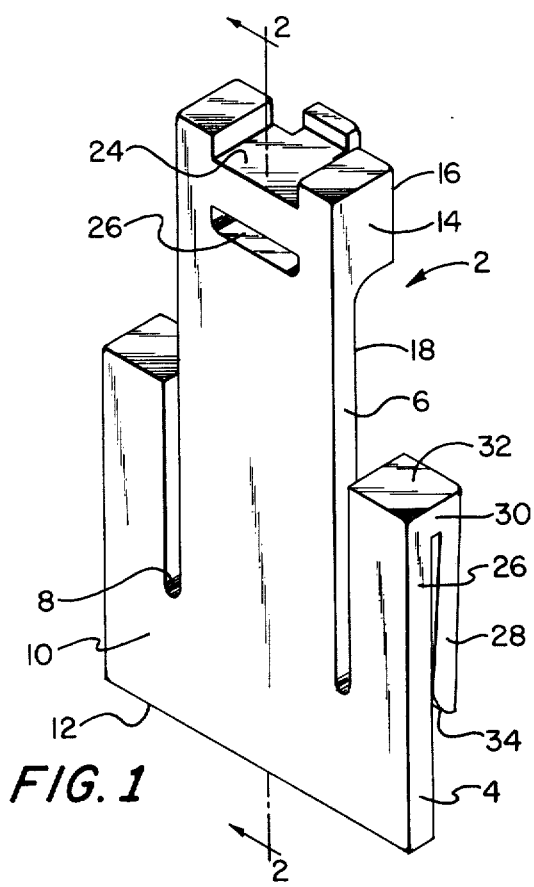
FIG. 1
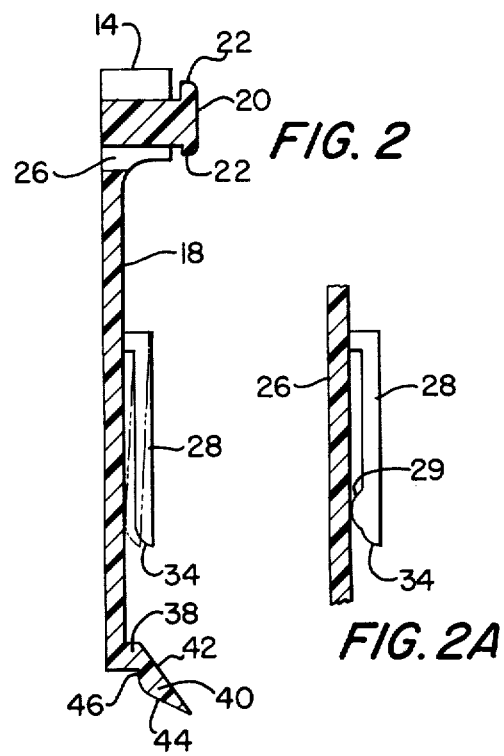
FIG. 2
FIG. 2A
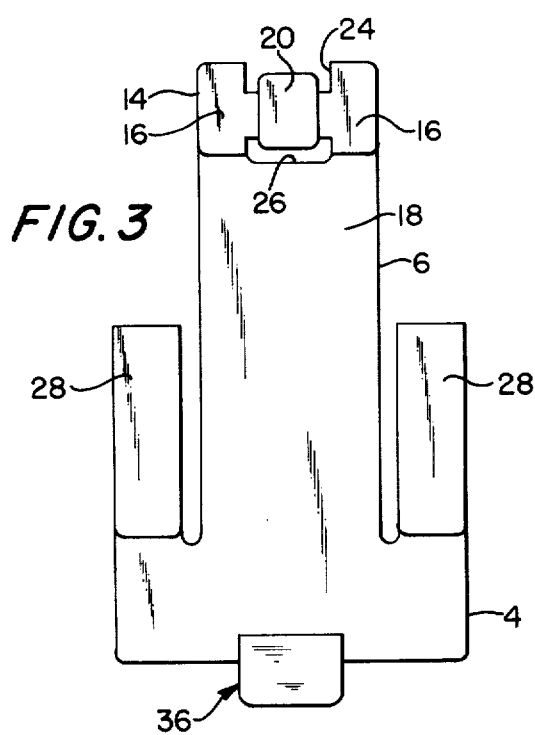
FIG. 3
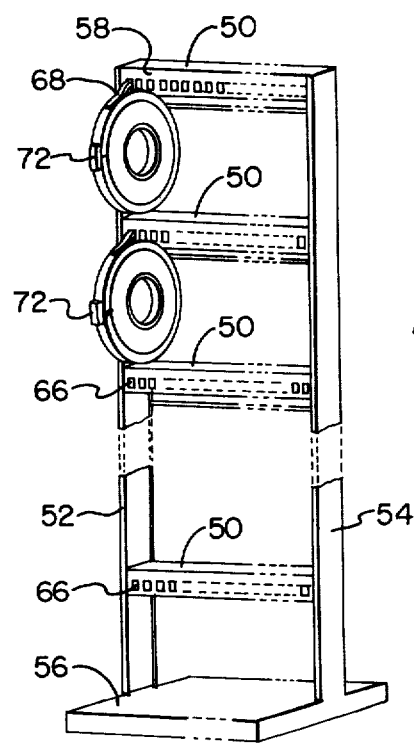
FIG. 4

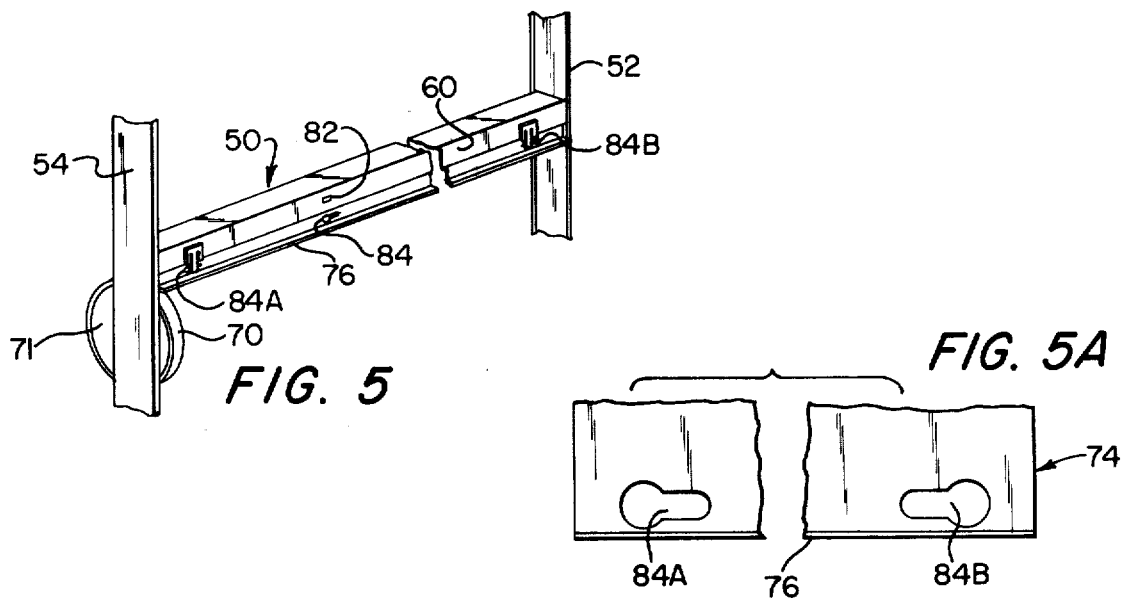
FIG. 5
FIG. 5A
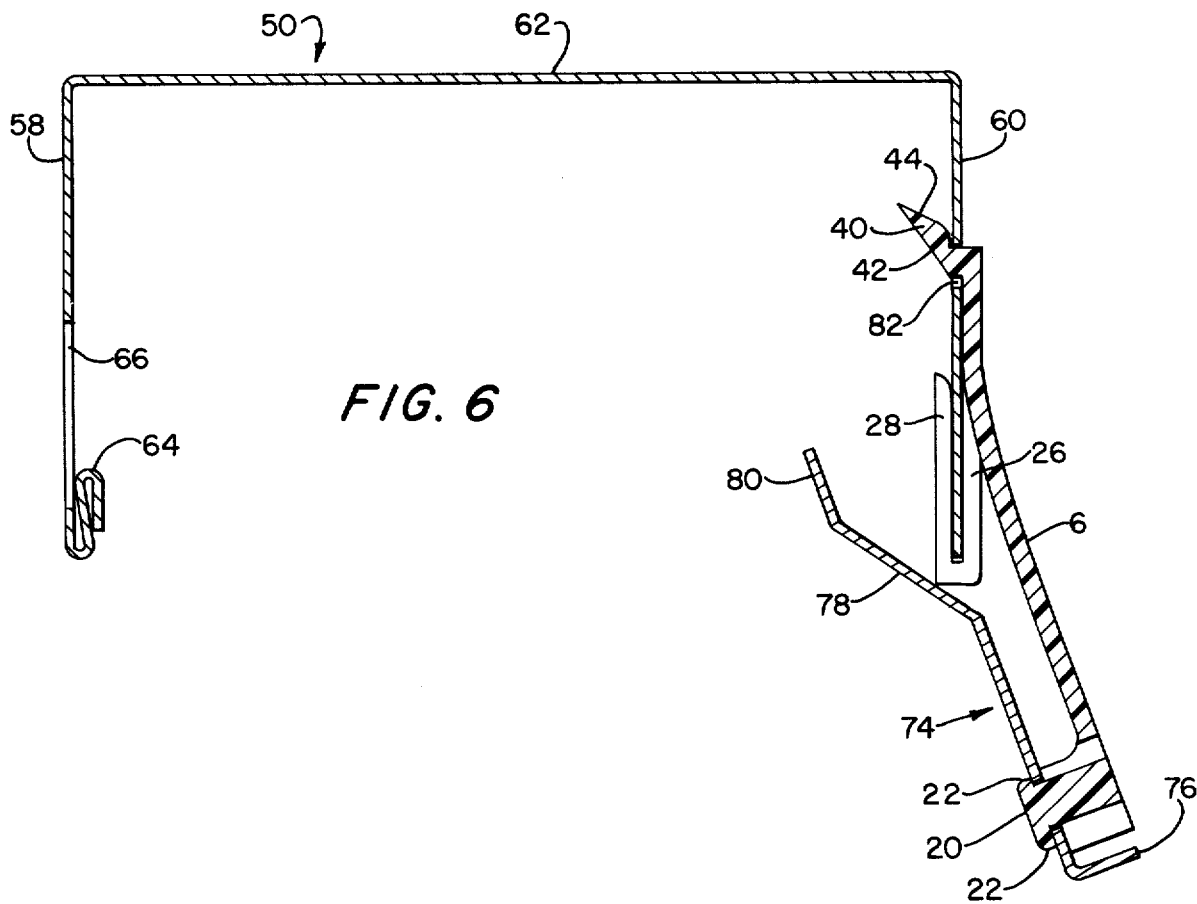
FIG. 6

SPRING FASTENER

This invention relates to spring fasteners and more particularly to fasteners for resiliently mounting one member to another so that the one member is supported in a predetermined position and is spring biased against movement out of that position.

One primary object of this invention is to provide a springlike fastener which is the functional equivalent of and may be substituted for a conventional spring-loaded hinge.

While fasteners made in accordance with this invention have many applications, they are especially useful as low cost and labor-saving replacements for the hinges employed to support the ejection assist bars in library racks of the type disclosed in U.S. Pat. No. 3,310,178 for high density storage and convenient accessibility of reels of record-bearing media surface magnetic tape. Accordingly another primary object of this invention is to provide a library rack for hanging rack for hanging reels of record-bearing tape which is an improvement upon the storage rack disclosed in U.S Pat. No. 3,310,178.

A further object is to provide a spring-like fastener which can be used to resiliently couple together two members which is made of plastic, is made as one piece, can be molded with precision using techniques well known to persons skilled in the plastics molding industry, is durable and can be attached to the two members quickly and without need for special tools. Still another object is to provide a spring-like fastener of the type described which is adapted to exert counteracting forces that hold it in place. A further optional object is to provide a fastener of the type described which interlocks with one of the two members to which it is connected by a snap action and has to be broken in order for it to be detached from that member.

These objects and other objects which are obvious to persons skilled in the art are achieved by providing a spring fastener which in its preferred form comprises a body section, a leaf spring section located at one side of the body section and having means at one end for attaching the leaf spring section to a first member, at least one spring clip section at said one side of the body section for attaching the body section to a second member, and a tab section located at the opposite side of the body section which is adapted to extend through an opening in the second member and to interlock with the second member. The invention further comprises provision of a rack for hanging and storing reels of record-bearing media which includes an ejection assist or stabilizer bar that is supported by fasteners of the type described and acts to maintain the reels aligned side by side in a uniform row and to facilitate removal of selected reels.

Other features and many of the attendant advantages of this invention are disclosed or rendered obvious by the following detailed description which is to be considered together with the accompanying drawings wherein:

FIG. 1 is a perspective view of a preferred form of spring fastener made in accordance with this invention;

FIG. 2 illustrates a vertical section taken along line 2—2 of FIG. 1;

FIG. 2A is a sectional view like FIG. 2 of a modification of the invention;

FIG. 3 is a front elevation of the same fastener;

FIG. 4 illustrates portions of a library-type storage rack for tape reels, some of which are shown mounted on the rack;

FIG. 5 is an enlarged view from the rear of a portion of the rack of FIG. 4 showing one of the ejection assist bars held by fasteners made as shown in FIGS. 1–3;

FIG. 5A is a fragmentary enlargement of a portion of the apparatus shown in FIG. 5; and FIG. 6 is a cross-sectional view on an enlarged scale showing one of the same fasteners holding together a rack member and its associated ejection assist bar, with the latter bent rearwardly as occurs when it is engaged by a rearwardly deflected tape reel.

Turning now to FIGS. 1–3, there is shown a one-piece spring fastener 2 which is made by moulding a suitable plastic material such as an acetal, nylon, polyethylene or polypropylene resin which in its cured form is stiff yet has enough resiliency and flexibility to function as a spring member. The fastener 2 comprises a flat generally rectangular body section 4 and an elongate tongue 6 which extends out from one edge 8 of the body section and functions as a leaf spring section. To facilitate correlation of the spring fasteners with associated portions of the storage rack shown in FIGS. 4 and 5, and also in contemplation of how the fasteners are oriented when embodied in the rack, the surface 10 of the body and tongue sections is to be considered the rear surface of the fastener and the edges 8 and 12 of the body section are to be considered the lower and upper edges respectively. The free end of tongue 6 is thickened so as to form a boss 14 with a flat surface 16 which is offset from the front surface 18 of the tongue and body sections. The front side of boss 14 is formed with a centrally located projection 20 that has a lip 22 at its upper and lower sides. The lips 22 are spaced a short distance from the plane of surface 18. A notch 24 and a wide flat aperture 26 are provided in the boss 14. These are not essential to operation of the fastener and instead are the necessary result of the mold design required to mold the lips 22.

Still referring to FIGS. 1–3, the fastener also is formed with two U-shaped spring clips each comprising a first leg 26 extending away from the lower edge 8 of body section 4 parallel to tongue 6, a second leg 28 extending back along the front side of leg 26 toward edge 12, and a connecting portion 30 which preferably but not necessarily has a flat lower surface 32 that forms sharp corners with the adjacent surface of legs 26 and 28. Each leg 28 preferably is formed so that it extends at an acute angle to leg 26 and at or near its free end it contacts or lies close to the latter leg. Preferably as shown the free end of each leg 28 is bevelled on the side facing leg 26 as shown at 34, whereby to facilitate inserting a member between the legs as hereinafter described. As an alternative measure as shown in FIG. 2A, the leg 28 could be formed so that it extended parallel to leg 26 and a rounded rib 29 could be provided on its inner surface to reduce or close off the gap between it and leg 26, so that leg 28 would be forced away from leg 26 when a member is inserted between them.

Completing the fastener of FIGS. 1–3 is a tab section 36 which is located centrally of and projects from the upper edge 12 of body section 4. The tab section comprises an offset connecting portion 38 that extends at a right angle to the front surface 18 and a detent or catch portion 40 that extends at an oblique angle to connecting portion 38 and body section 4 and is tapered longitudinally so that its free end terminates in a thin straight edge. More specifically, the catch portion 40 has a flat front surface 42 that forms an extension of a bevelled surface at the front end of connecting portion 38, and a rear surface 44 that is angulated as shown to form a sharp essentially right angle corner 46 with the adjacent surface of connecting portion 38.

The fastener just described is stiff yet has a resilient flexibility such that tongue 6 can bend and exhibits the behavior of a leaf spring and a restoring force is built up in legs 26 and 28 and connecting portion 30 when the free ends of legs 28 are bent away from legs 26. The tab section 36 also exhibits a spring stiffness and is capable of being flexed relative to body section 4.

Turning now to FIGS. 4 and 5, the mode of using the fasteners of FIGS. 1-3 will now be described. FIG. 4 shows a storage rack for storing tape reels in an arrangement allowing a high storage density. The rack comprises a plurality of horizontal sheet metal rack members 50 supported in a vertically-tiered relationship by a pair of upstanding framework members 52 and 54 that are affixed to a base 56. Each rack member 50 is an inverted channel and comprises (see also FIG. 6) vertical front and rear walls 58 and 60 and a horizontal top wall 62. Rear wall 60 hangs slightly lower than front wall 58 and the latter is bent back upon itself along its lower edge so as to form an upside down generally U-shaped flange 64 that lies close against its rear surface. The front wall 58 has a horizontally-extending row of closely spaced identical apertures 66 that extend below the rolled over upper edge of flange 64. Each aperture is sized for insertion of the hook-shaped ends of a reel hanger member 68 that is affixed to the outer periphery of the flexible tape reel cover band 70 which is releasably secured in enclosing relationship to the parallel circular sides of a reel 71 of tape or the like by a latch unit 72 that is adapted to releasably lock together the ends of the band. Of course the particular form of reel-encircling band used for hanging a reel forms no part of this invention and, for example, the reel hanger member 68 and latch unit 72 may be combined in a single assembly as in the tape reel cover band illustrated in FIGS. 11-14 of U.S. Pat. No. 3,310,178.

Associated with and depending from each rack member 50 is an elongate ejection-assist bar 74 which not only facilitates removal of a selected tape reel from a row of closely spaced tape reels suspended from the rack member but also prevents them from swaying back and forth. Each ejection assist bar is resiliently coupled to and suspended from a rack member by a plurality of fasteners 2 made in accordance with the invention. In contrast to the ejection assist bar shown in U.S. Pat. No. 3,310,178, the bar 74 is angulated as shown so as to provide an angled portion 78 and an offset upper portion 80 which extends up in front of the rear wall 60. To stiffen the bar 74 its lower edge is bent to form a flange 76. As an alternative measure the lower edge of bar 74 could be rolled into a round bead.

Connection of the ejection assist bars 74 to the rack members 50 by the fasteners 2 is achieved by providing horizontally elongate rectangular holes 82 in the rear walls of the rack members and keyhole-shaped apertures 84 in the ejection assist bars adjacent the flanges 76. The apertures 84 are formed so that their long dimension extends lengthwise of the bar 74. Additionally the vertical dimension of the smaller portion of each hole 84 is about equal to the thickness of projection 20 measured between the extremities of the two lips 22 (as seen in FIG. 2) but greater than the thickness of the projection 20 measured between lips 22 and the plane of the rear surface 16 of boss 14. The vertical dimension of the larger portion of each hole 84 is greater than the thickness of projection 20 measured between the extremities of lips 22. Accordingly each fastener 2 can be slidably interlocked with ejection assist bar 74 by inserting the projection 20 of the fastener through the larger portion of a keyhole aperture 84 and thus sliding the fastener laterally to locate the projection in the smaller part of the same aperture. The gap between the lips 22 and the rear surface 16 of boss 14 is sized so that it is about equal to the thickness of the bar 74. As a consequence the projection 20 will make a relatively tight fit with the small portion of the aperture 84. Since the projections 20 have flat top and bottom surfaces betwen lips 27 and the plane of rear surface 16, the sides of the smaller portions of keyhole apertures 84 also are straight edges as shown in FIG. 5A. Of course the projections 20 could be rounded in cross-section. At least one keyhole-shaped aperture 84A is formed so that it extends in an opposite direction to at least one other like aperture 84B (see FIG. 5A). Stated another way, a particular end (e.g. the large end) of one keyhole aperture faces the corresponding end of another like aperture 84. As a result if the fasteners are held fast to a rack member 50, the ejection assist bar 74 cannot be detached by sliding it so as to align the large portions of keyhole apertures 84 with the projections 20 of the fasteners, since at least one keyhole aperture and one projection will cooperate to block movement of bar 74 longitudinally in either direction relative to the rack member.

Attachment of an ejection assist bar 74 to a frame member 50 by means of two or more fasteners 2 is accomplished in two stages. First each fastener is connected to the ejection assist bar by inserting the projection 20 of the fastener into the large portion of one of the keyhole apertures and then sliding the fastener laterally so that the projection 20 interlocks with the small portion of the keyhole slot. In a typical rack at least three fasteners are attached to the ejection assist bar, one adjacent each end and the other fasteners at selected points intermediate the two ends. The next and final stage is to attach each fastener to the rear wall 60 of the rack member 50. This is achieved by bringing the bar 74 close to the rack member 50 so that the tabs 40 of the several fasteners are vertically aligned with the openings 82 in the rear wall 60 and the lower edge of the wall lies between the bevelled surfaces 34 of the spring clip legs 28 and the associated legs 26 of each fastener. Then the bar 74 is forced upwardly so that the spring clip legs are urged apart by the wall 60 and the tabs 40 slide along the rear surface of wall 60 far enough to enter the openings 78. As the tabs 40 slide up along the rear surface of wall 60 the legs 26 and 28 are under spring tension due to the tabs 40 holding the body portions 4 of the fasteners away from wall 60. As soon as the tabs reach the openings 82, the spring tension built up in the legs 26 and 28 urges the leading edges of the tabs to enter the openings. As the bar 74 continues to be forced upwardly the slanted surfaces 42 and 44 of each tab cooperate with the lower and upper edges of the adjacent opening 82 to direct the tab to pass through the opening so that the tab connecting portion 38 extends through the opening (as shown in FIG. 6) and the corner 46 of the tab establishes an interlocking relation between the tab and the upper edge of the hole 82. The resulting connection between the fasteners and the rear wall of the rack member is substantially permanent inasmuch as counteracting forces are produced by the engagement of the wall with body section 4, tab 40, and spring clip legs 26 and 28 of each fastener. If the fasteners are made to adequate tolerances, in most cases they have to be broken in order to be removed from the rack member without use of special tools.

The installed ejection assist bar is held vertical by the fastener 2, yet the latter have enough spring stiffness to tend to resist deflection of the ejection assist bar by a tape reel hanging from the associated rack member. Hence the bar 74 acts as a restraint to stabilize the hanging reels and prevent them from swaying. However, if manually a reel hanging from the rack member is pushed rearwardly with moderate force, its band 70 will engage the bar 74 adjacent to the flange 76 and drive it back. As this is done the tongues 6 of the several fasteners 2 will deflect as shown in FIG. 6 and during such deflection will store energy. Hence if the manual force pushing the reel rearwardly is removed, the fasteners will spring back to their original unflexed state, thereby restoring the bar 74 to its original vertical position and causing the reel in question to swing forward beyond the other hanging reels far enough for an operator to grasp it and remove it from the rack. It is to be noted that no mechanical stops are required to limit forward movement of the ejection assist bar when the selected reel is released; this is because a substantial portion of each tongue 6 overlaps the rear wall and hence the wall itself acts to limit forward movement of bar 74. It is to be noted also that rearward movement of bar 74 is limited by interception of the portion 78 of bar 74 by the lower portions of spring clip legs 28 (see FIG. 6).

It is to be understood that the fasteners may be modified without departing from the inventive concepts without departing from the inventive concepts herein described. Thus, for example, the tabs 40 and apertures 78 may be omitted and the fasteners secured to the rack member by means of a suitable cement. Other modifications will be obvious to persons skilled in the art.

We claim:

1. A fastener for use in connecting together two members comprising a body section, a pair of spring clip means at one margin of said body section for mounting said fastener to a first member, a tongue extending away from said one margin beyond said spring clip means, said pair of spring clip means being located on each at opposite sides of said tongue, each of said spring clip means comprising a first leg that is co-planar with said tongue and a second leg with one end connected to said first leg and another end extending close to and resisting flexing away from said first leg, and a projection with oppositely directed lips at the outer end of said tongue for securing said tongue to a second member, said fastener being formed in one piece from a material which (a) is relatively stiff yet (B) has enough resiliency and flexibility to function as a spring member.

2. A fastener according to claim 1 wherein said outer end of said tongue is formed with a boss, and said projection is integral with said boss.

3. A fastener according to claim 1 having a front side and a rear side with said projection being on said front side, and further wherein said spring clip means comprises a pair of legs which are connected together at one end and resist separation at the opposite end, and one of said legs is co-planar with said tongue and the other leg is disposed on the front side of said fastener.

4. A fastener according to claim 1 in combination with a first member connected to said body section by said spring clip means and a second member connected to said tongue by said securing means.

5. A fastener according to claim 1 formed of a plastic material.

6. Reel storage apparatus for use with a plurality of reel units where each reel includes a pair of parallel sides and a peripheral closure for the sides provided with a peripheral hanger, said apparatus comprising a support, hanger means held by said support and including at least one row of horizontally-aligned hanger portions each disposed for separate separable hooking engagement with a different peripheral hanger of one of the reel units, and ejection-assist means held by said support, said ejection-assist means including deflectable means positioned to engage peripheries of the reel units which may be hung side-by-side from said hanger means, and spring fastener means resiliently mounting said deflectable means to said support, said resiliently deflectable means being disposed below the level of said row and resiliently resisting deflections of the reel units in one angular direction about said row, whereby manually-induced deflection of any of the reel units in said one direction results in rebound deflection thereof in the opposite direction to a position where that reel unit projects out of alignment with the others and may be conveniently grasped for manual removal from said hanger means, said spring fasteners each being a fastener as defined by claim 1.

* * * * *